United States Patent
Sakairi et al.

(10) Patent No.: US 9,556,906 B2
(45) Date of Patent: Jan. 31, 2017

(54) SYNTHETIC RESIN-MADE SLIDING BEARING

(71) Applicants: OILES CORPORATION, Tokyo (JP); OILES DEUTSCHLAND GMBH, Ober-Moerlen (DE)

(72) Inventors: Yoshikazu Sakairi, Fujisawa (JP); Katsunori Saito, Fujisawa (JP); Robert Hamrodi, Ober-Moerlen (DE); Kai Metzler, Ober-Moerlen (DE); Yoshiteru Igarashi, Ober-Moerlen (DE)

(73) Assignees: OILES CORPORATION, Tokyo (JP); OILES DEUTSCHLAND GMBH, Ober-Moerlen (DE)

( * ) Notice: Subject to any disclaimer, the term of this patent is extended or adjusted under 35 U.S.C. 154(b) by 0 days.

(21) Appl. No.: 14/767,397

(22) PCT Filed: Feb. 5, 2014

(86) PCT No.: PCT/JP2014/000603
§ 371 (c)(1),
(2) Date: Aug. 12, 2015

(87) PCT Pub. No.: WO2014/125792
PCT Pub. Date: Aug. 21, 2014

(65) Prior Publication Data
US 2015/0377286 A1    Dec. 31, 2015

(30) Foreign Application Priority Data
Feb. 15, 2013   (JP) .................................. 2013-028462

(51) Int. Cl.
F16C 17/04    (2006.01)
F16C 33/20    (2006.01)
(Continued)

(52) U.S. Cl.
CPC .............. *F16C 33/20* (2013.01); *F16C 17/10* (2013.01); *F16C 17/18* (2013.01);
(Continued)

(58) Field of Classification Search
CPC ............ F16C 17/04; F16C 33/20; F16C 17/10
(Continued)

(56) References Cited

U.S. PATENT DOCUMENTS

| 6,918,701 B2 * | 7/2005 | Ueno ...................... F16C 17/26 384/125 |
| 8,740,233 B2 * | 6/2014 | Morishige ............ B60G 15/068 280/124.155 |

(Continued)

FOREIGN PATENT DOCUMENTS

| JP | 1-100922 | 7/1989 |
| JP | 2001-027229 | 1/2001 |

(Continued)

OTHER PUBLICATIONS

International Search Report for PCT/JP2014/000603, mailed Mar. 25, 2014, 3 pages.
(Continued)

*Primary Examiner* — Phillip A Johnson
(74) *Attorney, Agent, or Firm* — Nixon & Vanderhye P.C.

(57) ABSTRACT

A synthetic resin-made sliding bearing 1 includes a synthetic resin-made upper casing 2 which is fixed to a mounting member on a vehicle body side through a mounting member; a synthetic resin-made lower casing 3 which is superposed on the upper casing 2 so as to be rotatable about an axis O in a circumferential direction R relative to the upper casing 2; and a synthetic resin-made sliding bearing piece 5 disposed in a space 4 between the upper casing 2 and the lower casing 3.

11 Claims, 12 Drawing Sheets

(51) Int. Cl.
*F16C 17/10* (2006.01)
*F16C 17/18* (2006.01)

(52) U.S. Cl.
CPC .. *B60G 2200/142* (2013.01); *B60G 2204/418* (2013.01); *B60G 2206/7101* (2013.01); *F16C 2361/53* (2013.01)

(58) Field of Classification Search
USPC .................................................. 384/368, 420
See application file for complete search history.

(56) References Cited

U.S. PATENT DOCUMENTS

| | | | |
|---|---|---|---|
| 2006/0215945 | A1 | 9/2006 | Miyata et al. |
| 2010/0040317 | A1 | 2/2010 | Kellam |
| 2010/0104228 | A1* | 4/2010 | Kaneko ................ B60G 15/068 384/420 |
| 2011/0019951 | A1 | 1/2011 | Kaneko |
| 2013/0142462 | A1 | 6/2013 | Morishige et al. |
| 2013/0322798 | A1* | 12/2013 | Morishige ................ F16C 17/04 384/420 |
| 2014/0112605 | A1 | 4/2014 | Morishige et al. |
| 2014/0355916 | A1 | 12/2014 | Morishige et al. |
| 2015/0316099 | A1 | 11/2015 | Morishige et al. |

FOREIGN PATENT DOCUMENTS

| | | | |
|---|---|---|---|
| JP | 2004-293589 | 10/2004 | |
| JP | 2009-250278 | 10/2009 | |
| JP | WO 2009122746 A1 * | 10/2009 | ............. B60G 11/15 |
| JP | 2009-257516 | 11/2009 | |
| JP | 2012-172814 | 9/2012 | |
| JP | WO 2012176380 A1 * | 12/2012 | ............. F16C 17/04 |
| JP | 2013-002603 | 1/2013 | |
| WO | WO 02/068835 | 9/2002 | |
| WO | WO 2012/017591 | 2/2012 | |
| WO | WO 2012/114679 | 8/2012 | |
| WO | WO 2012/169130 | 12/2012 | |

OTHER PUBLICATIONS

U.S. Office Action issued in U.S. Appl. No. 14/767,700 dated Jun. 8, 2016.
Extended European Search Report issued in App. No. 14751917.7 dated Jun. 23, 2016.
International Search Report issued in PCT/JP2014/000592 dated Mar. 25, 2014.
Extended European Search Resort issued in App. No. 14751056.4 dated Sep. 20, 2016.

\* cited by examiner

SYNTHETIC RESIN-MADE SLIDING BEARING

This application is the U.S. national phase of International Application No. PCT/JP2014/000603 filed 5 Feb. 2014, which designated the U.S. and claims priority to JP Patent Application No. 2013-028462 filed 15 Feb. 2013, the entire contents of each of which are hereby incorporated by reference.

TECHNICAL FIELD

The present invention relates to a synthetic resin-made sliding bearing, and more particularly to a sliding bearing which is suitably incorporated as a sliding bearing of a strut-type suspension (Macpherson type) in a four-wheeled motor vehicle.

BACKGROUND ART

In general, a strut-type suspension is mainly used for a front wheel of a four-wheeled motor vehicle, and is so arranged that a strut assembly incorporating a hydraulic shock absorber in an outer cylinder integrated with a main shaft is combined with a suspension coil spring. Among such suspensions, there is a type of structure in which the axis of the suspension coil spring is actively offset with respect to the axis of the strut, so as to allow the sliding of a piston rod of the shock absorber incorporated in the strut to be effected smoothly, and there is another type of structure in which the axis of the suspension coil spring is arranged in alignment with the axis of the strut. In either structure, a rolling bearing using balls or needles or a synthetic resin-made sliding bearing is disposed between a mounting member for a motor vehicle body and an upper spring seat member of the suspension coil spring to allow the rotation to be effected smoothly when the strut assembly rotates together with the suspension coil spring by the steering operation.

PRIOR ART DOCUMENTS

Patent Documents

[Patent Document 1] JP-A-2004-293589
[Patent Document 2] JP-A-2009-250278

Incidentally, since the upper spring seat member, on which the aforementioned bearing is disposed, is generally made of sheet metal and is therefore relatively heavy, and since the upper spring seat member made of sheet metal needs to be provided with coating for rust prevention, even if the synthetic resin-made sliding bearing is used instead of the expensive rolling bearing to attain the light weight and a low price of the undercarriage of the motor vehicle, there are limits to such attempts for the light weight and the low price owing to the weight, manufacturing cost, assembly cost, and the like of the upper spring seat member.

In Patent Document 1, a strut sliding bearing is proposed which is comprised of a synthetic resin-made upper casing having a vehicle body-side bearing surface for a vehicle body side and an annular lower surface; a reinforced synthetic resin-made lower casing which contains reinforced fibers and is superposed on the upper casing so as to be rotatable about the axis of the upper casing, and which has an annular upper surface opposed to the annular lower surface of the upper casing; and a synthetic resin-made annular thrust sliding bearing piece and a tubular radial bearing piece which are interposed between the annular lower surface and the annular upper surface, wherein a spring bearing surface for a suspension coil spring is integrally formed on a portion of the lower casing on an outer peripheral side of the vehicle body-side bearing surface and the thrust sliding bearing piece.

In addition, in Patent Document 2, a thrust sliding bearing is proposed which is comprised of a synthetic resin-made upper casing which has a vehicle body-side bearing surface for a vehicle body side and an annular lower surface; a reinforced synthetic resin-made lower casing which contains reinforced fibers and is superposed on the upper casing so as to be rotatable about an axis of the upper casing, and on which an annular upper surface opposed to the annular lower surface and a spring bearing surface for a suspension coil spring are integrally formed; and a thrust sliding bearing piece which is disposed in an annular gap between the annular lower surface and the annular upper surface and has annular thrust sliding bearing surfaces which are slidably brought into contact with the annular lower surface and the annular upper surface, wherein the vehicle body-side bearing surface, the thrust sliding bearing surfaces, and the spring bearing surface are arranged by being juxtaposed to each other in an axial direction.

According to these sliding bearings, since the reinforced synthetic resin-made lower casing containing reinforced fibers has the spring bearing surface for the suspension coil spring, it is possible to omit the spring seat member made of sheet metal, so that it is possible to eliminate a weight increase ascribable to the upper spring seat member made of sheet metal and a price increase ascribable to such as the fabrication, coating, and assembly of the upper spring seat member made of sheet metal, thereby making it possible to attain the light weight and a low price of the undercarriage of the motor vehicle.

SUMMARY OF THE INVENTION

Problems that the Invention is to Solve

However, since the lower casing, which is one of the sliding mating surfaces of the above-described sliding bearing, is formed of a reinforced synthetic resin containing a reinforcing filler such as glass fibers, if sliding occurs between the thrust sliding bearing piece and the lower casing, a problem can possibly occur in that the thrust sliding bearing piece is worn down by the lower casing, thereby causing durability and the smoothness of the steering operation to decline.

The present invention has been devised in view of the above-described aspects, and its object is to provide a synthetic resin-made sliding bearing which is capable of inhibiting the sliding between the synthetic resin-made sliding bearing piece and the reinforced synthetic resin-made lower casing containing a reinforcing filler such as glass fibers to avoid the wear of the sliding bearing piece and a decline in slidability, thereby making it possible to maintain smooth steering operation.

Means for Overcoming the Problems

A synthetic resin-made sliding bearing in accordance with the present invention comprises: a synthetic resin-made upper casing, a reinforced synthetic resin-made lower casing superposed on the upper casing so as to be rotatable about an axis in a circumferential direction relative to the upper casing, and a synthetic resin-made sliding bearing piece disposed between the upper casing and the lower casing, wherein the upper casing includes: an upper casing base portion having an annular lower surface in a vertical direction; an inner peripheral-side cylindrical suspended portion suspended from a radial inner peripheral end portion of the upper casing base portion; an outer peripheral-side cylindrical suspended portion suspended from a radial outer peripheral end portion of the upper casing base portion; and an engaging bulged portion provided on a lower portion of a cylindrical inner peripheral surface of the outer peripheral-side cylindrical suspended portion, wherein the lower casing includes: a lower casing base portion having an annular upper surface in the vertical direction; a cylindrical protruding portion which protrudes downwardly from an annular lower surface of the lower casing base portion and has a cylindrical inner peripheral surface continuously connected to a cylindrical inner peripheral surface of the lower casing base portion; an annular protruding portion which protrudes upwardly from the annular upper surface of the lower casing base portion; an inner peripheral-side annular upright wall portion and an outer peripheral-side annular upright wall portion which protrude upwardly from an annular upper surface of the annular protruding portion so as to form on the annular upper surface of the annular protruding portion an annular recessed portion in cooperation with the annular upper surface; an annular collar portion which protrudes radially outwardly from a lower end portion of a cylindrical outer peripheral surface of the annular protruding portion; at least one projecting portion which projects radially outwardly from the cylindrical outer peripheral surface of the annular protruding portion between an annular upper surface of the annular protruding portion and the annular collar portion in the vertical direction; and an annular plate-like portion protruding radially outwardly from a lower end portion of a cylindrical outer peripheral surface of the lower casing base portion, and wherein the sliding bearing piece includes: an annular thrust sliding bearing piece portion having an annular upper surface and an annular lower surface in the vertical direction; an annular connecting piece portion extending radially outwardly from an outer peripheral end portion of the thrust sliding bearing piece portion and having an annular upper surface continuously connected to the annular upper surface; a cylindrical radial sliding bearing piece portion which is suspended from an outer peripheral end portion of the annular connecting piece portion and has a cylindrical inner peripheral surface and a cylindrical outer peripheral surface; and a corrugated meshing portion in which projecting portions and indented portions are alternately formed along the circumferential direction on the cylindrical inner peripheral surface of the radial sliding bearing piece portion, the sliding bearing piece being disposed between the upper casing and the lower casing such that the thrust sliding bearing piece portion is fittingly inserted into the annular recessed portion of the lower casing and such that the cylindrical inner peripheral surface of the radial sliding bearing piece portion is brought into contact with cylindrical outer peripheral surfaces of the outer peripheral-side annular upright wall portion and the annular protruding portion and the indented portion of the corrugated meshing portion is meshed with the projecting portion so as to inhibit the rotation of the sliding bearing piece about the axis with respect to the lower casing, the upper casing being combined with the lower casing such that the annular lower surface of the upper casing base portion is brought into slidable contact with the annular upper surface of the thrust sliding bearing piece portion, and the cylindrical inner peripheral surface of the outer peripheral-side cylindrical suspended portion is brought into slidable contact with the cylindrical outer peripheral surface of the radial sliding bearing piece portion, and such that the engaging bulged portion is resiliently fitted to the annular collar portion of the lower casing.

According to such a synthetic resin-made sliding bearing, since the indented portions of the corrugated meshing portion on the cylindrical inner peripheral surface of the radial sliding bearing piece portion are meshed with the projecting portions, the sliding bearing piece is prevented from rotating about the axis with respect to the lower casing, with the result that the sliding between the sliding bearing piece, on the one hand, and the upper casing and the lower casing, on the other hand, is confined to the sliding between the synthetic resins excellent in the sliding characteristics between the annular upper surface of the thrust sliding bearing piece portion and the annular lower surface of the upper casing base portion and between the cylindrical outer peripheral surface of the radial sliding bearing piece portion and the cylindrical inner peripheral surface of the outer peripheral-side cylindrical suspended portion. Therefore, it becomes possible to avoid the wear of the sliding bearing piece due to the lower casing, enabling smooth steering operation over extended periods of time.

In the synthetic resin-made sliding bearing in accordance with the present invention, the lower casing base portion and the cylindrical protruding portion protruding downwardly from the annular lower surface of the lower casing base portion may be reinforced by a metallic reinforcing member having a cylindrical portion which is fitted over a cylindrical outer peripheral surface of the cylindrical protruding portion and an annular collar portion which is formed integrally with one end portion of the cylindrical portion and is in contact with the annular lower surface of the lower casing base portion.

According to such a sliding bearing, as the annular lower surface of the lower casing base portion serving as an abutment surface of the suspension coil spring is reinforced by the metallic reinforcing member, it is possible to attain further improvement of the strength of the annular lower surface, so that it is possible to avoid causing damage and the like to the annular lower surface and, hence, the lower casing.

In the synthetic resin-made sliding bearing in accordance with the present invention, an annular recessed groove may be formed in an annular end face of the cylindrical protruding portion of the lower casing, and an outer peripheral surface of an end portion of the cylindrical outer peripheral surface of the cylindrical protruding portion with the annular recessed groove formed therein may be formed as an annular tapered surface which gradually expands radially outwardly of the cylindrical outer peripheral surface of the cylindrical protruding portion, excluding the outer peripheral surface of the end portion, toward the annular end face of the cylindrical protruding portion, in which case the reinforcing member fitted over the cylindrical outer peripheral surface of the cylindrical protruding portion may be prevented from coming off downwardly as the outer peripheral surface of the end portion formed as the annular tapered surface of the cylindrical protruding portion in the cylindrical portion projects radially outwardly on a lower end surface side of the cylindrical portion.

According to such a sliding bearing, since the annular recessed groove is formed in the annular lower surface of the cylindrical protruding portion, the fitting of the cylindrical portion of the reinforcing member over the cylindrical protruding portion can be effected easily by virtue of the easy diameter reducibility and flexibility of the cylindrical outer peripheral surface at the lower end portion of the cylindrical protruding portion and by virtue of the radially inwardly elastic deformation of the lower end portion of the cylindrical protruding portion. After the fitting, since the reinforcing member is prevented from coming off downwardly by the end portion of the cylindrical outer peripheral surface of the cylindrical protruding portion whose diameter is enlarged in diameter outwardly in the radial direction of the lower casing, the reinforcing member and the sliding bearing can be handled as an integral unit during the period until the sliding bearing is mounted to the mounting member of the strut-type suspension, so that their handling is facilitated.

The thrust sliding bearing piece portion of the sliding bearing piece may have pluralities of inner recessed portions and outer recessed portions which are formed in the annular upper surface thereof along the circumferential direction and in at least two rows including an inner row and an outer row in the radial direction, and such inner recessed portions and outer recessed portions may be arranged with phase differences with respect to each other in the circumferential direction.

Each of the plurality of inner recessed portions may be defined by an inner circular arc-shaped wall surface extending in a circular arc shape about the axis as a center; an outer circular arc-shaped wall surface extending in a circular arc shape about the axis as the center radially outwardly of the inner circular arc-shaped wall surface; a pair of semicircular wall surfaces respectively continuously connected to the inner circular arc-shaped wall surface and the outer circular arc-shaped wall surface and opposed to each other in the circumferential direction; and a bottom wall surface continuously connected to respective ones of the inner circular arc-shaped wall surface, the outer circular arc-shaped wall surface, and the pair of semicircular wall surfaces. Further, each of the plurality of outer recessed portions may be defined by an inner circular arc-shaped wall surface extending in a circular arc shape about the axis as the center; an outer circular arc-shaped wall surface extending in a circular arc shape about the axis as the center radially outwardly of the inner circular arc-shaped wall surface; a pair of semicircular wall surfaces respectively continuously connected to the inner circular arc-shaped wall surface and the outer circular arc-shaped wall surface and opposed to each other in the circumferential direction; and a bottom wall surface continuously connected to respective ones of the inner circular arc-shaped wall surface, the outer circular arc-shaped wall surface, and the pair of semicircular wall surfaces.

In addition, the thrust sliding bearing piece portion may have annular recessed grooves which are formed in the annular upper surface thereof along the circumferential direction and in at least two rows including an inner row and an outer row and formed concentrically with each other.

A ratio of a total area of opening surfaces of the pluralities of inner recessed portions and outer recessed portions in surfaces which combine the opening surfaces of the pluralities of inner recessed portions and outer recessed portions and the annular upper surface of the thrust sliding bearing piece portion, a ratio of a total area of opening surfaces of the at least two annular recessed grooves in total surfaces which combine the opening surfaces of the annular recessed grooves and the annular upper surface of the thrust sliding bearing piece portion, or a ratio of a total area of opening surfaces of the pluralities of inner recessed portions and outer recessed portions and opening surfaces of the at least two annular recessed grooves in surfaces which combine the opening surfaces of the pluralities of inner recessed portions and outer recessed portions, opening surfaces of the annular recessed grooves, and the annular upper surface of the thrust sliding bearing piece portion, is preferably 20 to 50%, more preferably 30 to 40%.

In these inner recessed portions and outer recessed portions as well as the annular recessed portions for retaining lubricating oil such as grease, it suffices if the aforementioned ratio is at least 20%, and if this ratio exceeds 50%, the strength of the thrust sliding bearing piece portion is caused to decline, and plastic deformation such as creep is liable to occur.

The radial sliding bearing piece portion of the sliding bearing piece may have a plurality of axial grooves which are open in the vertical direction and are formed on the cylindrical outer peripheral surface thereof by being spaced apart at equal intervals in the circumferential direction, and these axial grooves may also serve as a sump section for holding lubricating oil such as grease.

The synthetic resin-made sliding bearing in accordance with the present invention is preferably used as a sliding bearing for a strut-type suspension of a four-wheeled motor vehicle.

The synthetic resin for forming the upper casing may be a thermoplastic synthetic resin such as polyacetal resin, polyamide resin, or polybutylene terephthalate resin, and the synthetic resin for forming the lower casing may be a reinforced thermoplastic synthetic resin such as polyacetal resin, polyamide resin, or polybutylene terephthalate resin containing 30 to 50% by mass of a reinforcing filler including glass fibers, glass powder, carbon fibers, and the like. As the synthetic resin for forming the sliding bearing piece, it is possible to cite a thermoplastic synthetic resin such as polyolefin resin including polyacetal resin, polyamide resin, polybutylene terephthalate resin, and polyester resin as preferred examples.

Advantages of the Invention

According to the present invention, it is possible to provide a synthetic resin-made sliding bearing which is capable of avoiding wear of the sliding bearing piece due to the lower casing and performing smooth steering operation over extended periods of time because of the following: since the indented portions of the corrugated meshing portion on the cylindrical inner peripheral surface of the radial sliding bearing piece portion are meshed with the projecting portions, the sliding bearing piece is prevented from rotating about the axis with respect to the lower casing, so that the sliding between the sliding bearing piece, on the one hand, and the upper casing and the lower casing, on the other hand, is confined to the sliding between the synthetic resins excellent in the sliding characteristics between the annular upper surface of the thrust sliding bearing piece portion and the annular lower surface of the upper casing base portion and between the cylindrical outer peripheral surface of the radial sliding bearing piece portion and the cylindrical inner peripheral surface of the outer peripheral-side cylindrical suspended portion of the upper casing base portion.

MODE FOR CARRYING OUT THE INVENTION

Figure 1:
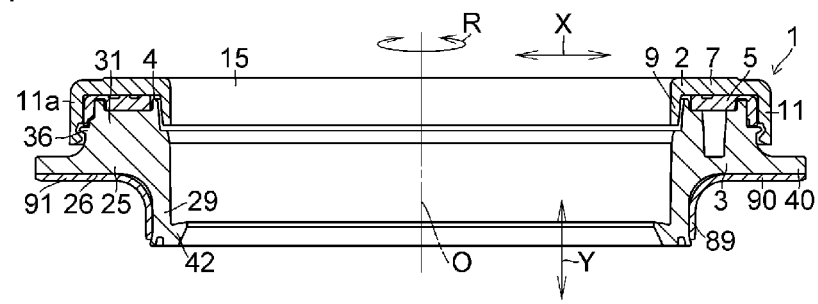
FIG. 1 is an explanatory cross-sectional view, taken in the direction of arrows along line I-I shown in FIG. 2, of a preferred embodiment of the present invention.
Figure 2:
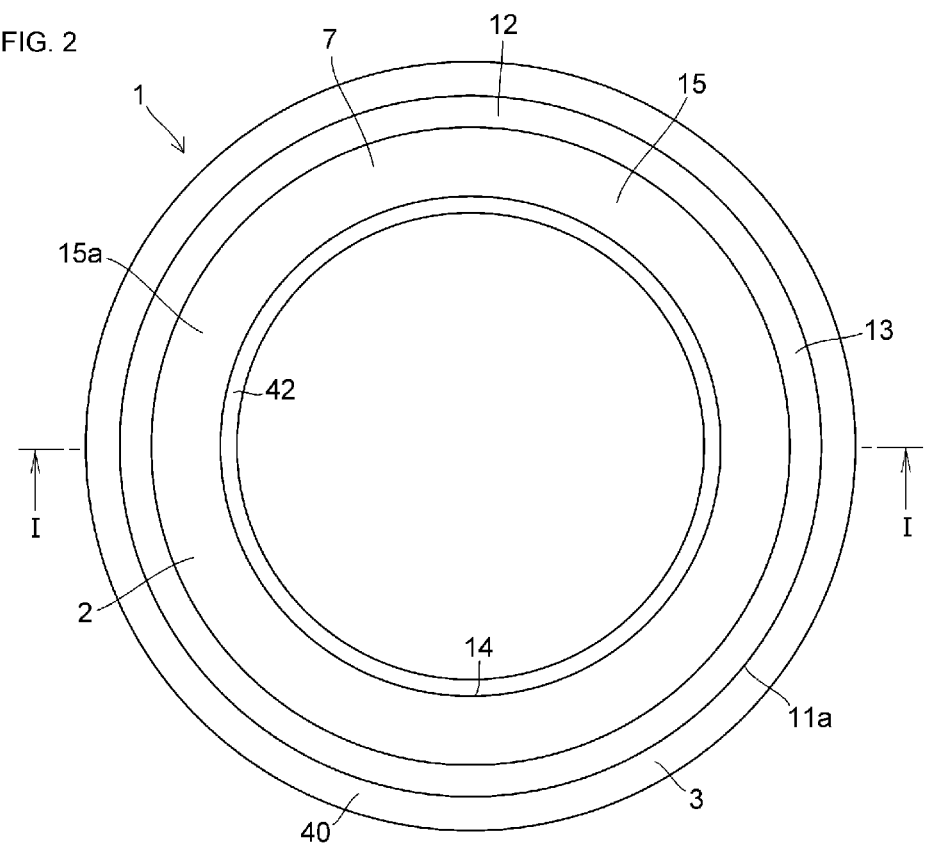
FIG. 2 is an explanatory plan view of the embodiment shown in FIG. 1.

In FIGS. 1 and 2, a synthetic resin-made sliding bearing 1 in accordance with this embodiment for use in a strut-type suspension of a four-wheeled motor vehicle is comprised of a synthetic resin-made upper casing 2 which is fixed to the vehicle body side through a mounting member; a synthetic resin-made lower casing 3 which is superposed on the upper casing 2 so as to be rotatable about an axis O in a circumferential direction R relative to the upper casing 2; and a synthetic resin-made sliding bearing piece 5 disposed in a space 4 between the upper casing 2 and the lower casing 3.

Figure 3:
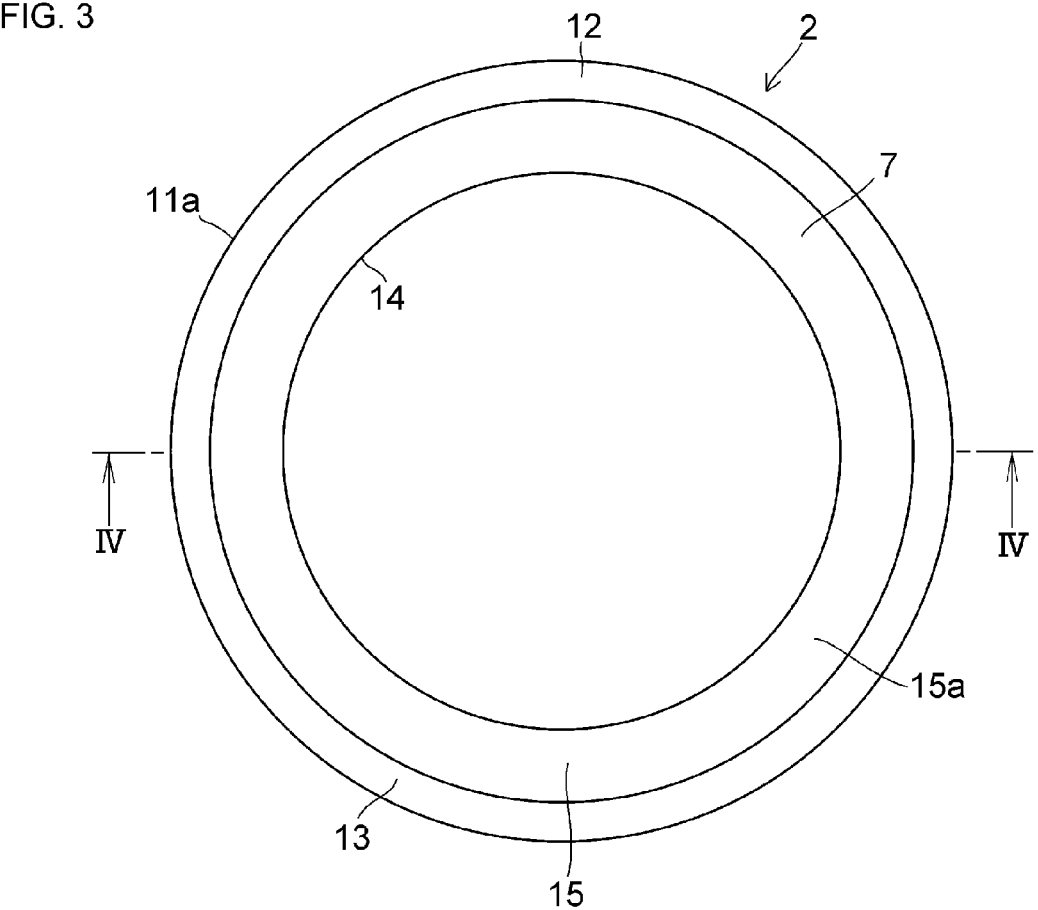
FIG. 3 is an explanatory plan view of an upper casing of the embodiment shown in FIG. 1.
Figure 4:
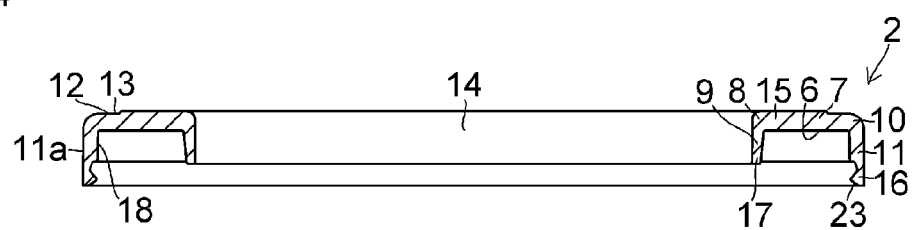
FIG. 4 is an explanatory cross-sectional view, taken in the direction of arrows along line IV-IV, of the upper casing of the embodiment shown in FIG. 3.
Figure 5:
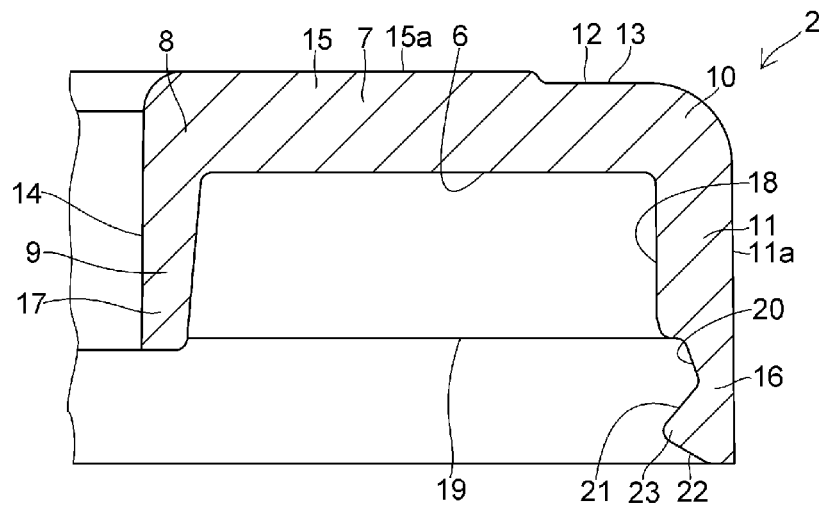
FIG. 5 is an explanatory partially enlarged cross-sectional view of the upper casing shown in FIG. 4.

As particularly shown in FIGS. 3 and 5, the upper casing 2 integrally includes: an annular upper casing base portion 7 having an annular lower surface 6 in a vertical direction (axial direction) Y; an inner peripheral-side cylindrical suspended portion 9 suspended from an inner peripheral end portion 8 in a radial direction X of the upper casing base portion 7; an outer peripheral-side cylindrical suspended portion 11 suspended from an outer peripheral end portion 10 in the radial direction X of the upper casing base portion 7 and having a cylindrical outer peripheral surface 11a continuously connected to an annular upper surface 12 of the upper casing base portion 7; and an annular seat portion 15 which protrudes upwardly from an annular upper surface 12 of the upper casing base portion 7 by leaving an annular flat portion 13 on an outer peripheral side of that annular upper surface 12 and has an upper surface 15a continuously connected to a cylindrical inner peripheral surface 14 of the inner peripheral-side cylindrical suspended portion 9.

An end portion 16 of the outer peripheral-side cylindrical suspended portion 11 extends longer in the downward direction than an end portion 17 of the inner peripheral-side cylindrical suspended portion 9, and formed on the end portion 16 are an annular shoulder portion 19 extending outwardly in the radial direction X, an inclined surface portion 20 which is gradually enlarged in diameter outwardly in the radial direction X of the annular shoulder portion 19, and an engaging bulged portion 23 bulging radially inwardly and having an inclined surface portion 21 which is continuously connected to the inclined surface portion 20 and is gradually reduced in diameter inwardly in the radial direction X and an inclined surface portion 22 which is continuously connected to the inclined surface portion 21 and is gradually enlarged in diameter outwardly in the radial direction X.

Figure 6:
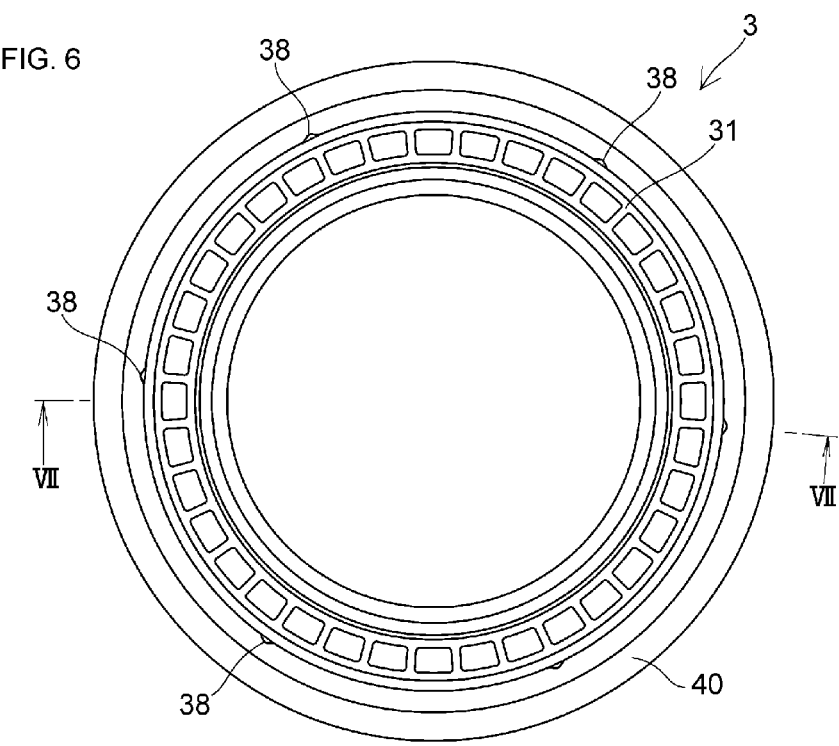
FIG. 6 is an explanatory plan view of a lower casing of the embodiment shown in FIG. 1.
Figure 7:
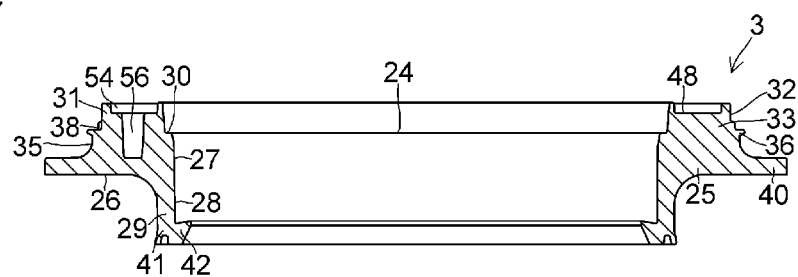
FIG. 7 is an explanatory cross-sectional view, taken in the direction of arrows along line VII-VII, of the lower casing of the embodiment shown in FIG. 6.
Figure 8:
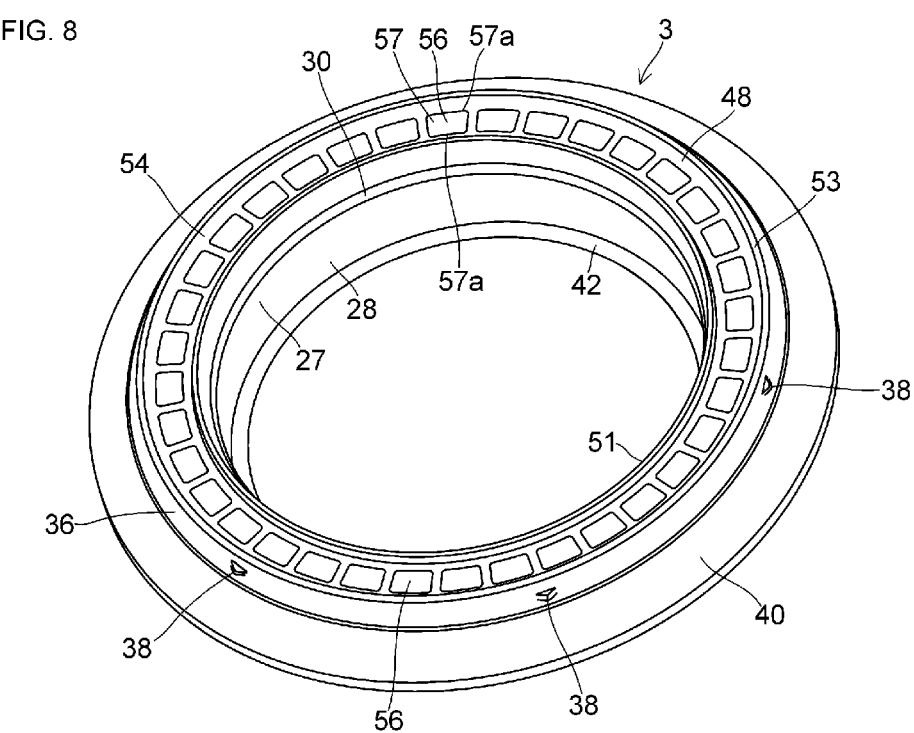
FIG. 8 is an explanatory perspective view of the lower casing shown in FIG. 7.
Figure 9:
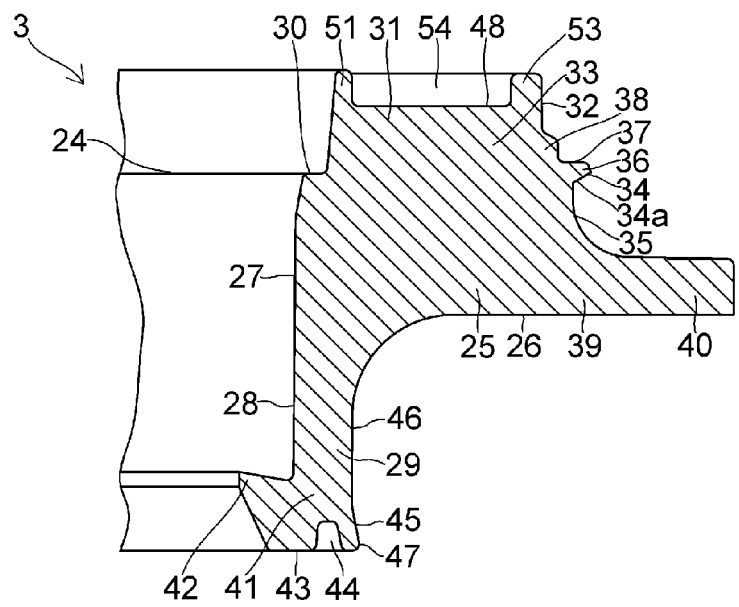
FIG. 9 is an explanatory partially enlarged cross-sectional view of the lower casing shown in FIG. 7.
Figure 10:
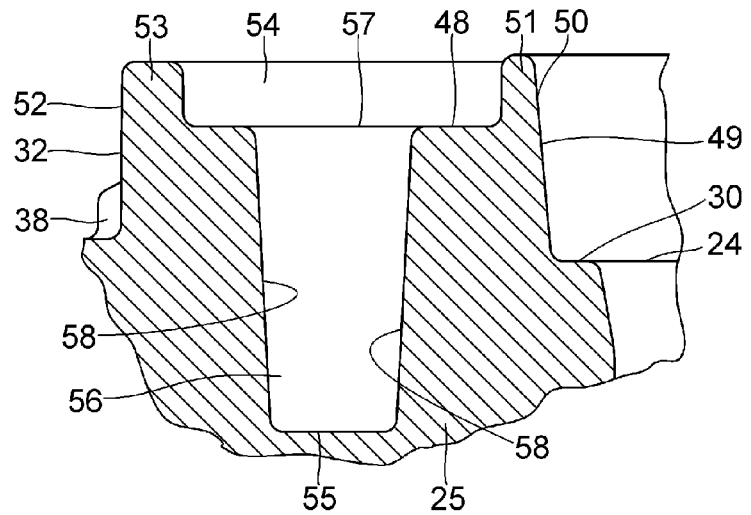
FIG. 10 is an explanatory partially enlarged cross-sectional view of the lower casing shown in FIG. 7.
Figure 11:
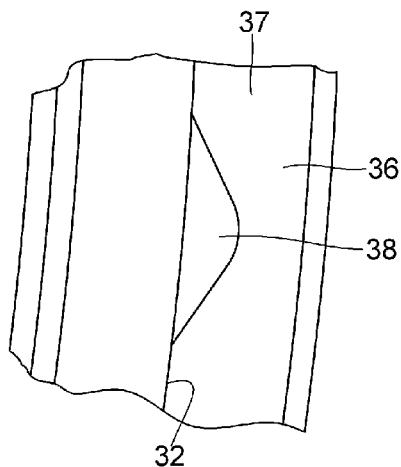
FIG. 11 is an explanatory enlarged plan view of an engaging projecting portion of the lower casing shown in FIG. 7.
Figure 12:
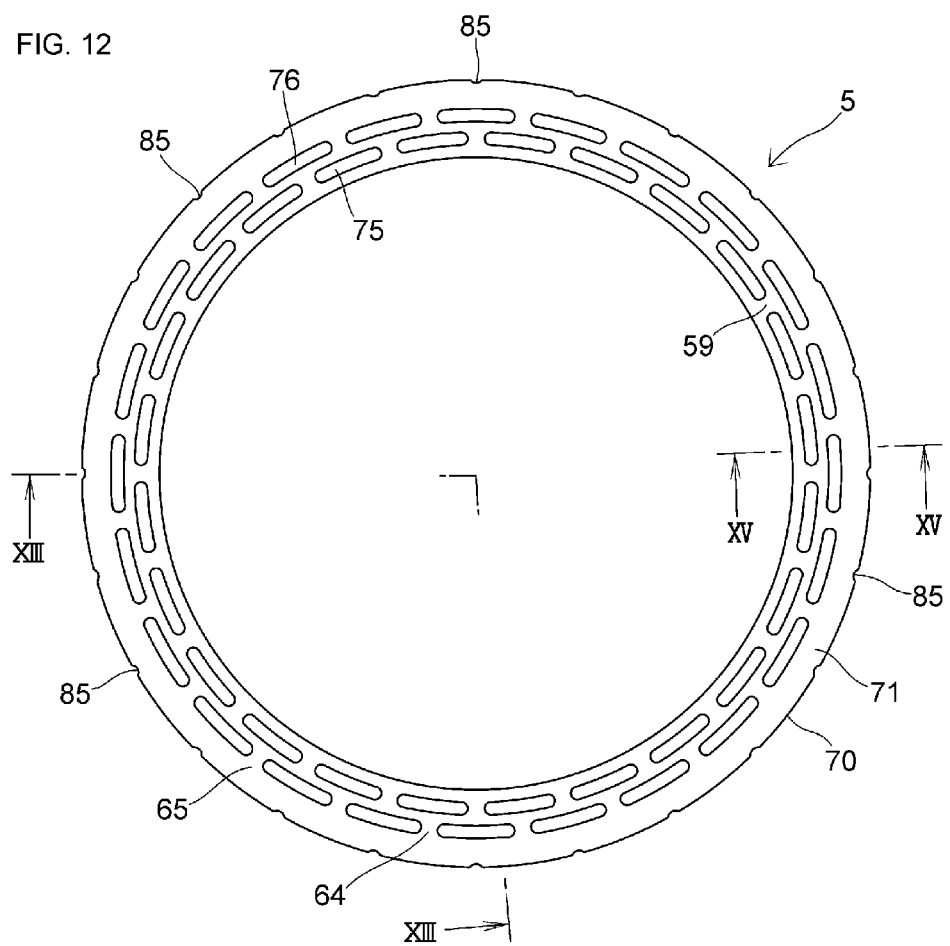
FIG. 12 is an explanatory plan view of a sliding bearing piece of the embodiment shown in FIG. 1.
Figure 13:
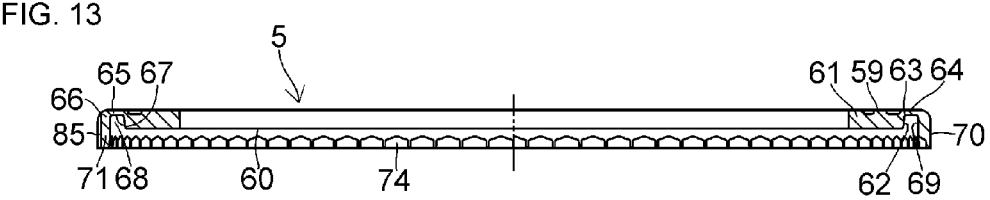
FIG. 13 is an explanatory cross-sectional view, taken in the direction of arrows along line XIII-XIII, of the sliding bearing piece of the embodiment shown in FIG. 12.
Figure 14:
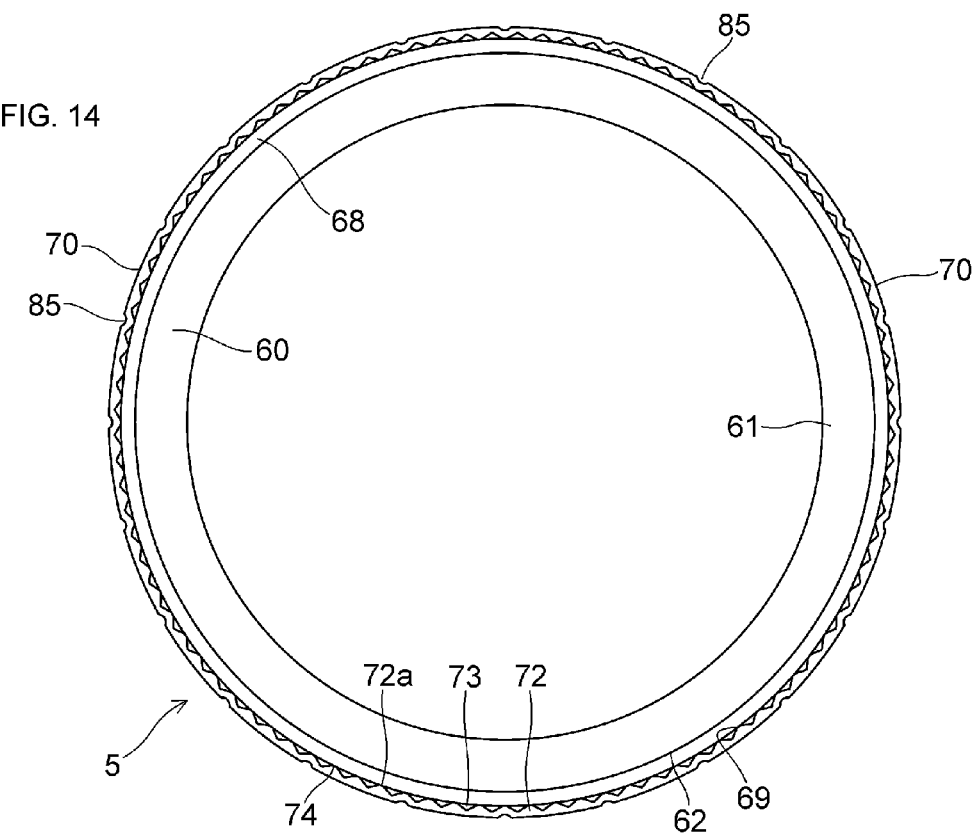
FIG. 14 is an explanatory bottom view of the sliding bearing piece shown in FIG. 12.
Figure 15:
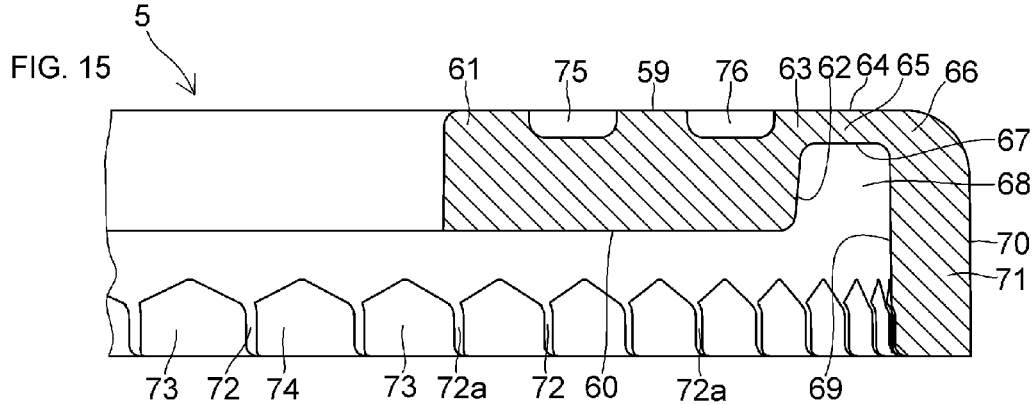
FIG. 15 is an explanatory cross-sectional view, taken in the direction of arrows along line XV-XV, of the sliding bearing piece shown in FIG. 12.
Figure 16:
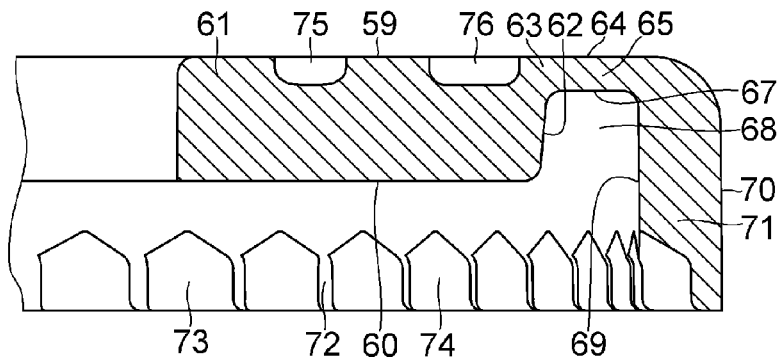
FIG. 16 is an explanatory partially enlarged cross-sectional view of the sliding bearing piece shown in FIG. 12.
Figure 17:
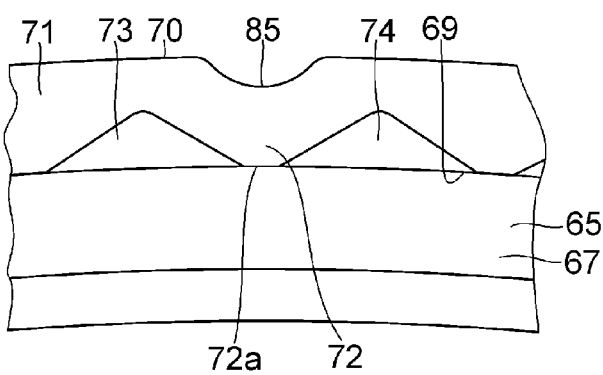
FIG. 17 is an explanatory partially enlarged plan view of the sliding bearing piece shown in FIG. 12.
Figure 18:
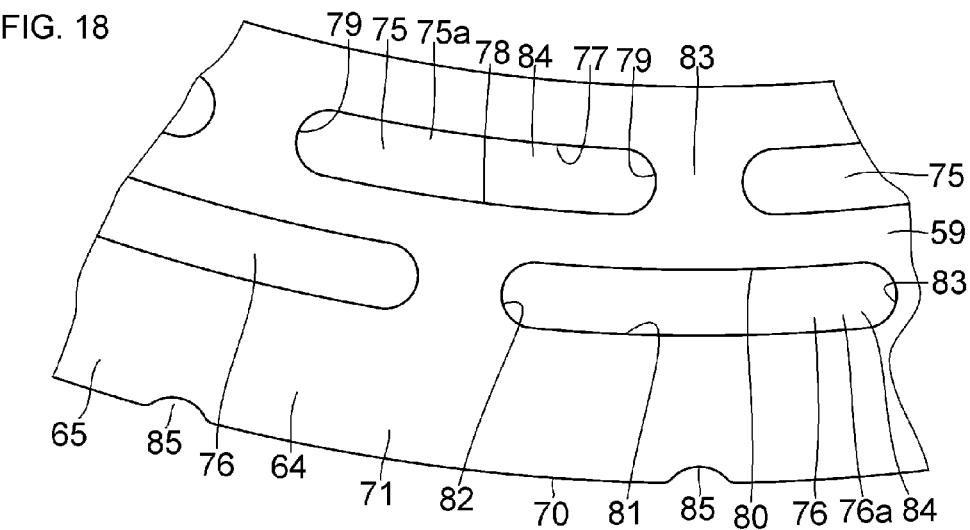
FIG. 18 is an explanatory partially enlarged plan view of the sliding bearing piece shown in FIG. 12.

As particularly shown in FIGS. 6 to 11, the lower casing 3 includes: an annular lower casing base portion 25 which has an annular upper surface 24 in the vertical direction Y; a cylindrical protruding portion 29 which protrudes downwardly from an annular lower surface 26 of the lower casing base portion 25 and has a cylindrical inner peripheral surface 28 continuously connected to a cylindrical inner peripheral surface 27 of the lower casing base portion 25; an annular protruding portion 31 which protrudes upwardly from the annular upper surface 24 of the lower casing base portion 25 by leaving an annular shoulder portion 30 between the same and the cylindrical inner peripheral surface 27 of the lower casing base portion 25; an annular collar portion 36 which extends outwardly in the radial direction X from a lower end portion 33 in the vertical direction Y of a cylindrical outer peripheral surface 32 of the annular protruding portion 31, and which is continuously connected to a cylindrical outer peripheral surface 35 of the lower casing base portion 25 via an inclined surface portion 34a which is formed on a lower surface 34 and is gradually reduced in diameter inwardly in the radial direction X; at least one projecting portion 38 with a triangular shape in a plan view, which projects outwardly in the radial direction X from the cylindrical outer peripheral surface 32 of the lower end 33 of the cylindrical protruding portion 31 and is continuously connected to an annular upper surface 37 of the annular collar portion 36, in FIG. 6, 6 projecting portions being provided in such a manner as to be arranged on the cylindrical outer peripheral surface 32 of the lower end 33 of the annular protruding portion 31 at equal intervals along the circumferential direction R; and an annular plate-like portion 40 extending outwardly in the radial direction X from a lower end portion 39 of the cylindrical outer peripheral surface 35 of the lower casing base portion 25.

An annular protruding portion 42 is formed on the cylindrical inner peripheral surface 28 of an end portion 41 of the cylindrical protruding portion 29 in such a manner as to extend inwardly in the radial direction X, and an annular recessed groove 44 is formed in an annular end face 43 of the cylindrical protruding portion 29 in such a manner as to be open at the annular end face 43. An outer peripheral surface 45 of the end portion 41 of the cylindrical protruding portion 29 with the annular recessed groove 44 formed therein is formed as an annular tapered surface 47 which is gradually enlarged in diameter outwardly in the radial direction X of a cylindrical outer peripheral surface 46 of the cylindrical protruding portion 29 toward the lower side in the vertical direction Y. Thus, flexibility in the radial direction X is imparted to the end portion 41 of the cylindrical protruding portion 29 which is formed into the annular tapered surface 47.

An inner annular upright wall portion 51 protruding upwardly in the vertical direction Y and having an inner peripheral surface 50 continuously connected to an inner peripheral surface 49 of the annular protruding portion 31 as well as an outer annular upright wall portion 53 protruding upwardly in the vertical direction Y and having a cylindrical outer peripheral surface 52 continuously connected to the cylindrical outer peripheral surface 32 of the annular protruding portion 31 are formed on an annular upper surface 48 of the annular protruding portion 31. An annular recessed portion 54 consisting of the inner annular upright wall portion 51, the annular upper surface 48, and the outer annular upright wall portion 53 is formed on the annular upper surface 48.

A plurality of hole portions 56 are formed in the annular upper surface 48, i.e., the bottom surface of the annular recessed portion 54, along the circumferential direction R in such a manner as to be open at the annular upper surface 48 and to extend from the annular upper surface 48 to the lower casing base portion 25 downwardly in the vertical direction Y, and are each provided with a bottom portion 55. As shown in FIGS. 6, 7, 8, and 10, each of the hole portions 56 has an opening portion 57 which is rectangular in a plan view, and the hole portion 56 on a long side 57a side of the opening portion 57 has a pair of inclined surfaces 58 which are opposed to each other and the interval between which is gradually reduced as they extend downwardly in the vertical direction Y. The hole portions 56 make uniform the thickness of the lower casing base portion 25 and the annular protruding portion 31 by preventing as practically as possible the occurrence of sink marks and the like during molding.

As particularly shown in FIGS. 12 to 18, the synthetic resin-made sliding bearing piece 5 disposed in the space 4 includes: an annular thrust sliding bearing piece portion 61 having an annular upper surface 59 in the vertical direction Y which is brought into slidable contact with the annular lower surface 6 of the upper casing base portion 7 as well as an annular lower surface 60 which is insertingly fitted in the annular recessed portion 54 formed in the annular upper surface 48 of the annular protruding portion 31 of the lower casing base portion 25 and is brought into contact with the annular upper surface 48, i.e., the bottom surface of the annular recessed portion 54; a thin-walled annular connecting piece portion 65 extending from an upper end portion 63 of a cylindrical outer peripheral surface 62 of the thrust sliding bearing piece portion 61 outwardly in the radial direction X and having an annular upper surface 64 continuously connected to the annular upper surface 59; a radial sliding bearing piece portion 71 which is suspended from an outer peripheral end portion 66 of the annular connecting piece portion 65 to form an annular recessed portion 68 in cooperation with the cylindrical outer peripheral surface 62 of the thrust sliding bearing piece portion 61 and an annular lower surface 67 of the annular connecting piece portion 65, and has a cylindrical inner peripheral surface 69 and a cylindrical outer peripheral surface 70; and a corrugated meshing portion 74 in which projecting portions 72 each having a triangular shape in a cross-sectional view and indented portions 73 each having a triangular shape in a plan view are alternately formed along the circumferential direction R on a lower portion of the cylindrical inner peripheral surface 69 of the radial sliding bearing piece portion 71, an apex portion 72a of each projecting portion 72 being formed flush with the cylindrical inner peripheral surface 69 of the radial sliding bearing piece portion 71.

As the projecting portions 38 formed at the lower end 33 of the cylindrical protruding portion 31 of the above-described lower casing 3 mesh with the indented portions 73 in the corrugated meshing portion 74, the sliding bearing piece 5 is inhibited from rotating in the circumferential direction R about the axis O with respect to the lower casing 3 and is integrated with the lower casing 3. Although, in this embodiment, the corrugated meshing portion 74 is formed over the entire circumference in the circumferential direction R of the cylindrical inner peripheral surface 69 of the radial sliding bearing piece portion 71, the corrugated meshing portion 74 may be formed only at those portions of the cylindrical inner peripheral surface 69 of the radial sliding bearing piece portion 71 that correspond to the projecting portions 38.

The thrust sliding bearing piece portion 61 has pluralities of inner recessed portions 75 and outer recessed portions 76 which are formed in the annular upper surface 59 along the circumferential direction R and in at least two rows including an inner row and an outer row in the radial direction X.

Each of the inner recessed portions 75 formed in the inner row is defined by an inner circular arc-shaped wall surface 77 which extends in a circular arc shape about the axis O as the center; an outer circular arc-shaped wall surface 78 which extends in a circular arc shape about the axis O as the center outwardly of the inner circular arc-shaped wall surface 77 in the radial direction X, i.e., whose diameter is enlarged in the radial direction X relative to the inner circular arc-shaped wall surface 77; a pair of semicircular wall surfaces 79 respectively continuously connected to the inner circular arc-shaped wall surface 77 and the outer circular arc-shaped wall surface 78 and opposed to each other in the circumferential direction R; and a bottom wall surface 75a continuously connected to respective ones of the inner circular arc-shaped wall surface 77, the outer circular arc-shaped wall surface 78, and the pair of semicircular wall surfaces 79.

Each of the plurality of outer recessed portions 76 formed in the outer row is defined by an inner circular arc-shaped wall surface 80 which extends in a circular arc shape about the axis O as the center; an outer circular arc-shaped wall surface 81 which extends in a circular arc shape about the axis O as the center outwardly of the inner circular arc-shaped wall surface 80 in the radial direction X, i.e., whose diameter is enlarged in the radial direction X relative to the inner circular arc-shaped wall surface 80; a pair of semicircular wall surfaces 82 respectively continuously connected to both the inner circular arc-shaped wall surface 80 and the outer circular arc-shaped wall surface 81 and opposed to each other in the circumferential direction R; and a bottom wall surface 76a continuously connected to respective ones of the inner circular arc-shaped wall surface 80, the outer circular arc-shaped wall surface 81, and the pair of semicircular wall surfaces 82. Each outer recessed portion 76 is arranged at a position corresponding to a discontinuous portion 83 in the circumferential direction R between adjacent ones of the inner recessed portions 75 formed in the inner row. Thus, the inner recessed portions 75 and the outer recessed portions 76 are arranged with phase differences with respect to each other in the circumferential direction R.

The pluralities of inner recessed portions 75 and outer recessed portions 76, which are formed in the annular upper surface 59 of the thrust sliding bearing piece portion 61 along the circumferential direction R and in at least two rows including the inner row and the outer row in the radial direction X, are arranged such that the ratio of the total area of opening surfaces 84 of the inner recessed portions 75 and the outer recessed portions 76 in total surfaces which combine the opening surfaces 84 of the inner recessed portions 75 and the outer recessed portions 76 and the annular upper surface 59 of the thrust sliding bearing piece portion 61, i.e., a thrust sliding bearing surface, is preferably 20 to 50%, more preferably 30 to 40%.

The radial sliding bearing piece portion 71 shown in FIGS. 12 to 18 has a plurality of axial grooves 85 which are open at their both ends in the vertical direction Y and are formed in the cylindrical outer peripheral surface 70 by being spaced apart at equal intervals in the circumferential direction R.

The pluralities of inner recessed portions 75 and outer recessed portions 76, which are formed in the annular upper surface 59 of the thrust sliding bearing piece portion 61 along the circumferential direction R and in at least two rows including the inner row and the outer row in the radial direction X, as well as the plurality of axial grooves 85 which are formed in the cylindrical outer peripheral surface 70 of the radial sliding bearing piece portion 71, serve as a sump section for lubricating oil such as grease.

Figure 19:
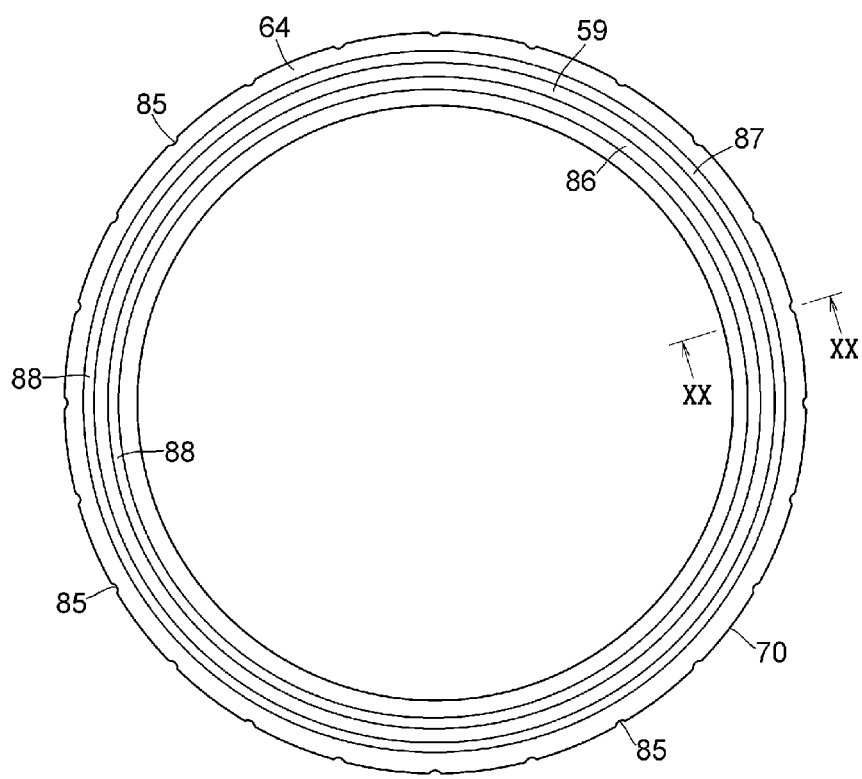
FIG. 19 is an explanatory plan view of another example of the sliding bearing piece of the embodiment shown in FIG. 1.
Figure 20:
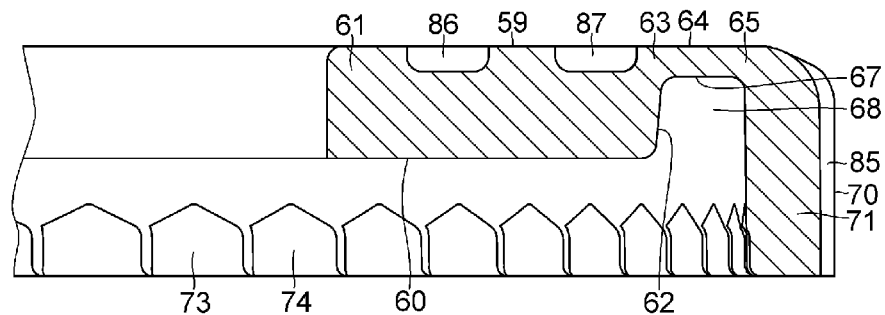
FIG. 20 is an explanatory cross-sectional view, taken in the direction of arrows along line XX-XX, of the sliding bearing piece shown in FIG. 19.

In the thrust sliding bearing piece portion 61, as shown in FIGS. 19 and 20, an inner annular recessed groove 86 and an outer annular recessed groove 87, which are formed along the circumferential direction R and in two rows including an inner row and an outer row in the radial direction X, may be formed in the annular upper surface 59, and the plurality of axial grooves 85 may be formed in the cylindrical outer peripheral surface 70 of the radial sliding bearing piece portion 71 by being spaced apart at equal intervals in the circumferential direction R.

The inner annular recessed groove 86 and the outer annular recessed groove 87, which are formed in the annular upper surface 59 of the thrust sliding bearing piece portion 61 along the circumferential direction R and in at least two rows including the inner row and the outer row in the radial direction X, are formed such that the ratio of the total area of opening surfaces 88 of the inner annular recessed groove 86 and the outer annular recessed groove 87 in total surfaces which combine the opening surfaces 88 of the inner annular recessed groove 86 and the outer annular recessed groove 87 and the annular upper surface 59 of the thrust sliding bearing piece portion 61, i.e., a thrust sliding bearing surface, is preferably 20 to 50%, more preferably 30 to 40%.

According to the thrust sliding bearing piece portion 61 of the sliding bearing piece 5 thus formed, since the inner recessed portions 75 and outer recessed portions 76, or the inner annular recessed groove 86 and the outer annular recessed groove 87, are formed in the annular upper surface 59, in the relative sliding in the circumferential direction R about the axis O between the annular upper surface 59 of the thrust sliding bearing piece portion 61 and the annular lower surface 6 of the upper casing base portion 7, it is possible to reduce the area of contact between the annular upper surface 59, which is the thrust sliding bearing surface and constitutes the sliding surface, and the mating member, i.e., the annular lower surface 6 of the upper casing base portion 7, thereby making it possible to increase the surface pressure (load per unit area) acting on the annular upper surface 59. Thus, it is possible to attain further lower friction through a combination of the lower friction due to the friction between the synthetic resins and the lower friction due to the presence on the sliding surfaces of the lubricating oil which is filled in the inner recessed portions 75 and the outer recessed portions 76, or the inner annular recessed groove 86 and the outer annular recessed groove 87.

Figure 21:
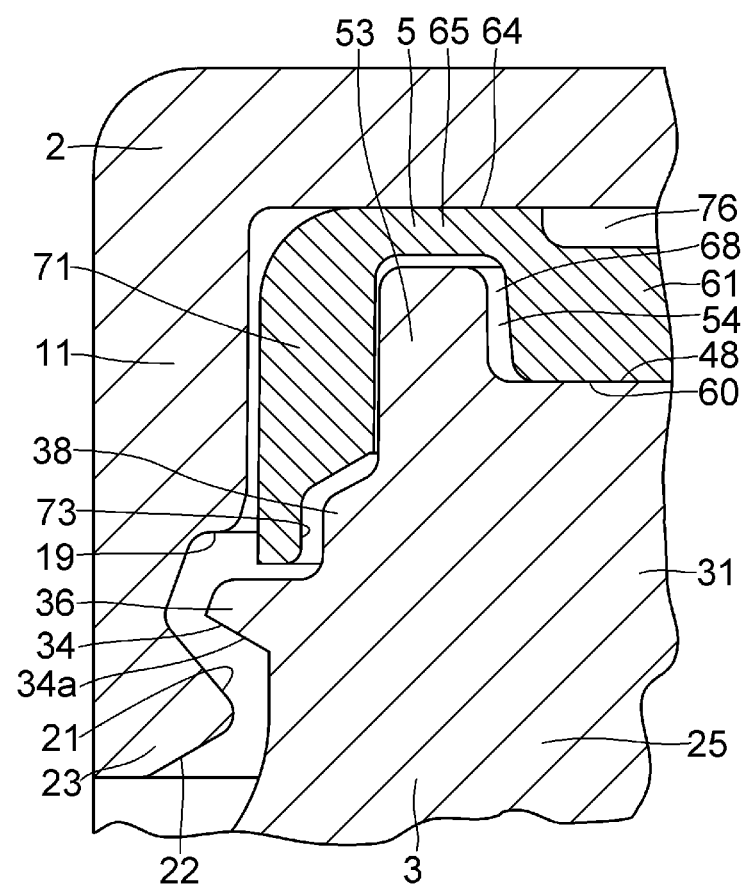
FIG. 21 is an explanatory partially enlarged cross-sectional view of a meshing portion between and including the lower casing and the sliding bearing piece of the sliding bearing of the embodiment shown in FIG. 1.

As shown in FIGS. 1 and 21, the sliding bearing piece 5 is assembled to the lower casing 3 by fittingly inserting the thrust sliding bearing piece portion 61 into the annular recessed portion 54 formed in the annular upper surface 48 of the annular protruding portion 31 of the lower casing base portion 25 to allow the annular lower surface 60 to be brought into contact with the annular upper surface 48, i.e., the bottom surface of the annular recessed portion 54, by fitting the annular recessed portion 68 over the outer annular upright wall portion 53 of the annular recessed portion 54, and by causing the projecting portions 38 formed at the lower end 33 of the cylindrical outer peripheral surface 32 of the annular protruding portion 31 of the lower casing base portion 25 to be meshed with the indented portions 73 of the corrugated meshing portion 74 formed on the cylindrical inner peripheral surface 69 of the radial sliding bearing piece portion 71, such that the sliding bearing piece 5 is inhibited from rotating in the circumferential direction R about the axis O with respect to the lower casing 3 and is integrated with the lower casing 3.

The upper casing 2 is assembled to the lower casing 3 by bringing the annular lower surface 6 into slidable contact with the annular upper surface 59 of the thrust sliding bearing piece portion 61 of the sliding bearing piece 5, by bringing the cylindrical inner peripheral surface 18 of the outer peripheral-side cylindrical suspended portion 11 into slidable contact with the cylindrical outer peripheral surface 69 of radial sliding bearing piece portion 71, and by causing the inclined surface portion 21 of the engaging bulged portion 23 formed at the end portion 16 of the cylindrical inner peripheral surface 18 of the outer peripheral-side cylindrical suspended portion 11 to be resiliently fitted to the annular collar portion 36 continuously connected to the cylindrical outer peripheral surface 35 of the lower casing base portion 25 of the lower casing 3.

Since the sliding bearing piece 5 is inhibited from rotating in the circumferential direction R about the axis O with respect to the lower casing 3 and is integrated with the lower casing 3, between the sliding bearing piece 5, on the one hand, and the upper casing 2 and the lower casing 3, on the other hand, sliding between the sliding bearing piece 5 and the lower casing 3 is inhibited, and sliding is confined to the sliding between the synthetic resins excellent in the sliding characteristics, i.e., between the annular upper surface 59 of the thrust sliding bearing piece portion 61 and the annular lower surface 6 of the upper casing base portion 7 and between the cylindrical inner peripheral surface 69 of the radial sliding bearing piece portion 71 and the cylindrical inner peripheral surface 18 of the outer peripheral-side cylindrical suspended portion 11 of the upper casing base portion 7, so that smooth steering operation is performed.

Figure 22:
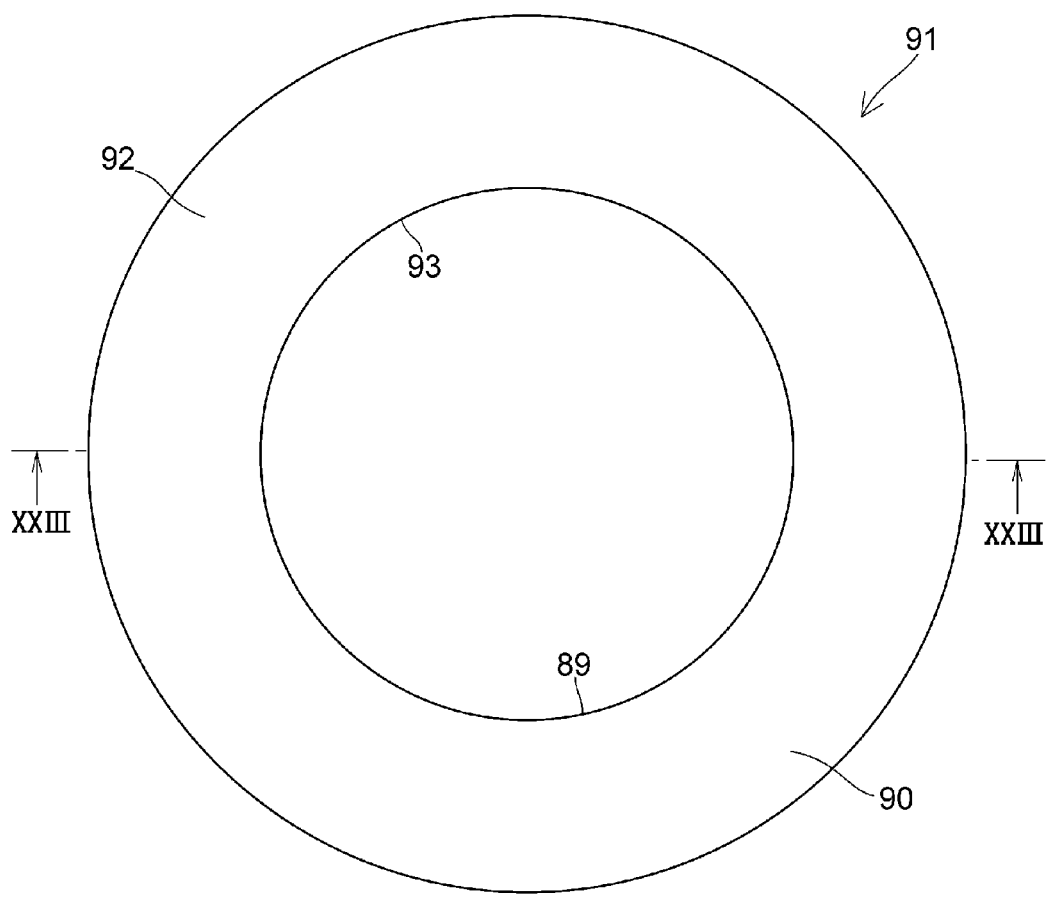
FIG. 22 is an explanatory plan view of a reinforcing member of the sliding bearing of the embodiment shown in FIG. 1.
Figure 23:
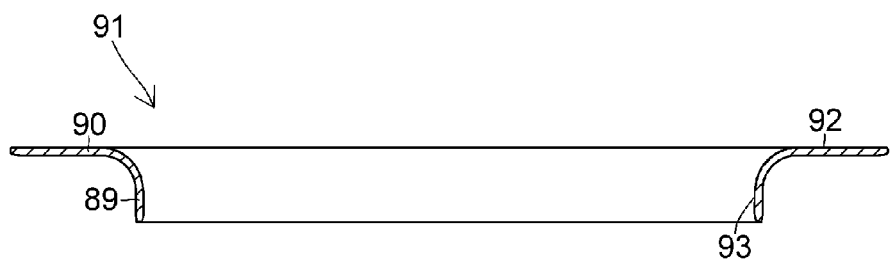
FIG. 23 is an explanatory cross-sectional view, taken in the direction of arrows XXIII-XXIII, of the reinforcing member shown in FIG. 22.
Figure 24:
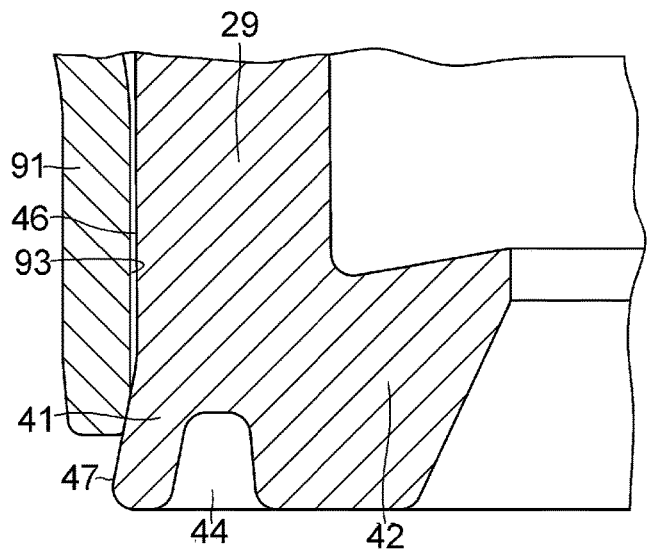
FIG. 24 is an explanatory enlarged cross-sectional view of a fitting section between and including the lower casing and the reinforcing member of the sliding bearing of the embodiment shown in FIG. 1.

A metallic reinforcing member 91, which has a cylindrical portion 89 and a wide annular collar portion 90 extending outwardly in the radial direction X from one end portion of the cylindrical portion 89, as particularly shown in FIGS. 22 and 23, is disposed on the lower casing 3 by bringing a surface 92 of the annular collar portion 90 into contact with the annular lower surface 26 of the lower casing base portion 25, and by fitting a cylindrical inner peripheral surface 93 of the cylindrical portion 89 over the cylindrical outer peripheral surface 46 of the cylindrical protruding portion 29 of the lower casing base portion 25, as shown in FIGS. 1 and 24.

As the metallic reinforcing member 91 is disposed on the lower casing 3, the annular lower surface 26 of the lower casing base portion 25 of the lower casing 3, which serves as a spring seat for the suspension coil, is reinforced by the annular collar portion 90 of the reinforcing member 91.

When the reinforcing member 91 is fitted to the lower casing 3, the end portion 41 of the cylindrical protruding portion 29 on which the annular tapered surface 47 of the lower casing base portion 25 is formed undergoes resilient deformation due to the flexibility thereof and facilitates the fitting of the reinforcing member 91 over the cylindrical outer peripheral surface 46 of the cylindrical protruding portion 29. After the fitting, as shown in FIG. 24, the annular tapered surface 47 of the end portion 41 of the cylindrical protruding portion 29 is resiliently restored more outwardly in the radial direction X than the cylindrical outer peripheral surface 46 of the cylindrical protruding portion 29, and the end portion of the cylindrical portion 89 of the reinforcing member 91 is therefore prevented from coming off downwardly in the vertical direction Y, so that the lower casing 3 and the reinforcing member 91 can be handled as an integral unit, thereby making it possible to facilitate the mounting of the sliding bearing 1 with the reinforcing member 91 fitted thereto to the strut assembly.

Figure 25:
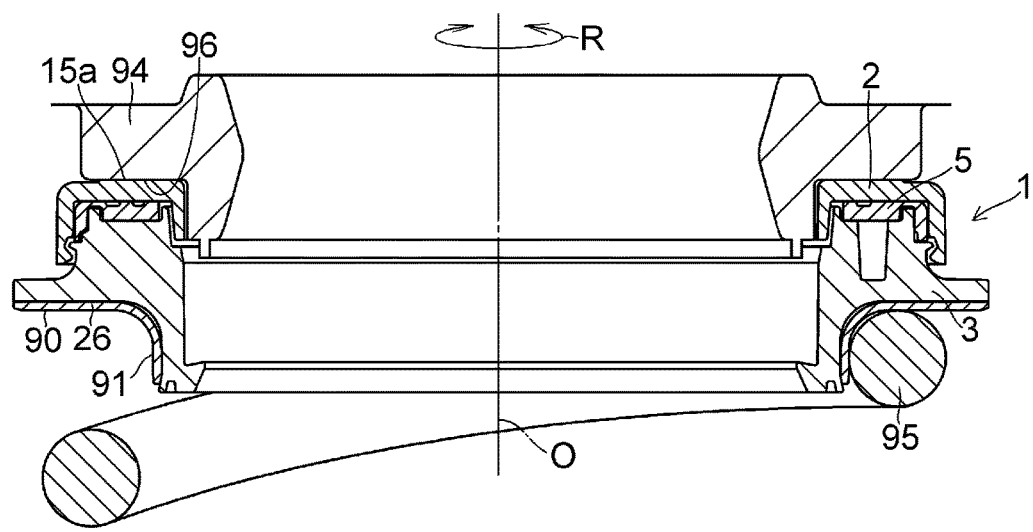
FIG. 25 is an explanatory cross-sectional view in which the sliding bearing of the embodiment shown in FIG. 1 is incorporated in a strut-type suspension.

As shown in FIG. 25, for example, the synthetic resin-made sliding bearing 1 thus formed may be applied to a strut-type suspension in a four-wheeled motor vehicle by disposing the synthetic resin-made sliding bearing 1 in accordance with this embodiment between a vehicle body-side bearing surface 96 of a vehicle body-side mounting member 94 and an upper end portion of a suspension coil spring 95 such that the annular seat portion 15 on the upper surface 15a of the upper casing 2 is abutted against the vehicle body-side mounting member 94, and such that the annular lower surface 26 of the lower casing base portion 25 as a spring bearing surface, or the annular collar portion 90 of the metallic reinforcing member 91 fitted to the annular lower surface 26 of the lower casing base portion 25, is abutted against the upper end portion of the suspension coil spring 95.

In the strut-type suspension shown in FIG. 25, the relative rotation in the circumferential direction R of the suspension coil spring 95 with respect to the vehicle body-side mounting member 94 is allowed in the sliding bearing 1 by the relative sliding in the circumferential direction R between the respective synthetic resins, excelling in the sliding characteristics, of the annular upper surface 59 of the thrust sliding bearing piece portion 61 with respect to the annular lower surface 6 of the upper casing base portion 7 and of the cylindrical outer peripheral surface 70 of the radial sliding bearing piece portion 71 with respect to the cylindrical inner peripheral surface 18 of the outer peripheral-side cylindrical suspended portion 11 of the radial sliding bearing piece portion 71.

DESCRIPTION OF REFERENCE NUMERALS

1: sliding bearing
2: upper casing
3: lower casing
4: space
5: sliding bearing piece
6: annular lower surface
7: upper casing base portion
9: inner peripheral-side cylindrical suspended portion
11: outer peripheral-side cylindrical suspended portion
23: engaging bulged portion
25: lower casing base portion
29: cylindrical protruding portion
31: annular protruding portion
36: annular collar portion
38: projecting portion
48: annular upper surface
51: inner annular upright wall portion
53: outer annular upright wall portion
54: annular recessed portion
61: thrust sliding bearing piece portion
71: radial sliding bearing piece portion
72: projecting portion
73: indented portion
74: corrugated meshing portion
91: reinforcing member

The invention claimed is:

1. A synthetic resin-made sliding bearing comprising: a synthetic resin-made upper casing, a reinforced synthetic resin-made lower casing superposed on said upper casing so as to be rotatable about an axis in a circumferential direction relative to said upper casing, and a synthetic resin-made sliding bearing piece disposed between said upper casing and said lower casing, wherein said upper casing includes: an annular upper casing base portion having an annular lower surface in a vertical direction; an inner peripheral-side cylindrical suspended portion suspended from a radial inner peripheral end portion of the upper casing base portion; an outer peripheral-side cylindrical suspended portion suspended from a radial outer peripheral end portion of the upper casing base portion; and an engaging bulged portion provided on a lower portion of a cylindrical inner peripheral surface of the outer peripheral-side cylindrical suspended portion, wherein said lower casing includes: an annular lower casing base portion having an annular upper surface in the vertical direction; a cylindrical protruding portion which protrudes downwardly from an annular lower surface of the lower casing base portion and has a cylindrical inner peripheral surface continuously connected to a cylindrical inner peripheral surface of the lower casing base portion; an annular protruding portion which protrudes upwardly from the annular upper surface of the lower casing base portion; an inner peripheral-side annular upright wall portion and an outer peripheral-side annular upright wall portion which protrude upwardly from an annular upper surface of the annular protruding portion so as to form on the annular upper surface of the annular protruding portion an annular recessed portion in cooperation with the annular upper surface; an annular collar portion which protrudes radially outwardly from a lower end portion of a cylindrical outer peripheral surface of the annular protruding portion; at least one projecting portion which projects radially outwardly from the cylindrical outer peripheral surface of the annular protruding portion between an annular upper surface of the annular protruding portion and the annular collar portion in the vertical direction; and an annular plate portion protruding radially outwardly from a lower end portion of a cylindrical outer peripheral surface of the lower casing base portion, and wherein said sliding bearing piece includes: an annular thrust sliding bearing piece portion having an annular upper surface and an annular lower surface in the vertical direction; an annular connecting piece portion extending radially outwardly from an outer peripheral end portion of the thrust sliding bearing piece portion and having an annular upper surface continuously connected to the annular upper surface; a radial sliding bearing piece portion which is suspended from an outer peripheral end portion of the annular connecting piece portion and has a cylindrical inner peripheral surface and a cylindrical outer peripheral surface; and a corrugated meshing portion in which projecting portions and indented portions are alternately formed along the circumferential direction on the cylindrical inner peripheral surface of the radial sliding bearing piece portion, said sliding bearing piece being disposed between said upper casing and said lower casing such that the thrust sliding bearing piece portion is fittingly inserted into the annular recessed portion of said lower casing and such that the cylindrical inner peripheral surface of the radial sliding bearing piece portion is brought into contact with cylindrical outer peripheral surfaces of the outer peripheral-side annular upright wall portion and the annular protruding portion and the indented portion of the corrugated meshing portion is meshed with the projecting portion so as to inhibit the rotation of said sliding bearing piece about the axis with respect to said lower casing, said upper casing being combined with said lower casing such that the annular lower surface of the upper casing base portion is brought into slidable contact with the annular upper surface of the thrust sliding bearing piece portion, and the cylindrical inner peripheral surface of the outer peripheral-side cylindrical suspended portion is brought into slidable contact with the cylindrical outer peripheral surface of the radial sliding bearing piece portion, and such that the engaging bulged portion is resiliently fitted to the annular collar portion of said lower casing.

2. The synthetic resin-made sliding bearing according to claim 1, wherein the lower casing base portion and the cylindrical protruding portion protruding downwardly from the annular lower surface of the lower casing base portion are reinforced by a metallic reinforcing member having a cylindrical portion which is fitted over a cylindrical outer peripheral surface of the cylindrical protruding portion and an annular collar portion which is formed integrally with one end portion of the cylindrical portion and is in contact with the annular lower surface of the lower casing base portion.

3. The synthetic resin-made sliding bearing according to claim 1, wherein an annular recessed groove is formed in an annular end face of the cylindrical protruding portion, and an outer peripheral surface of an end portion of the cylindrical outer peripheral surface of the cylindrical protruding portion with the annular recessed groove formed therein is formed as an annular tapered surface which gradually expands radially outwardly of the cylindrical outer peripheral surface of the cylindrical protruding portion, excluding the outer peripheral surface of the end portion, toward the annular end face of the cylindrical protruding portion, the reinforcing member fitted over the cylindrical outer peripheral surface of the cylindrical protruding portion being prevented from coming off downwardly as the outer peripheral surface of the end portion formed as the annular tapered surface of the cylindrical protruding portion in the cylindrical portion projects radially outwardly on a lower end surface side of the cylindrical portion.

4. The synthetic resin-made sliding bearing according to claim 1, wherein the thrust sliding bearing piece portion has pluralities of inner recessed portions and outer recessed portions which are formed in the annular upper surface thereof along the circumferential direction and in at least two rows including an inner row and an outer row in the radial direction, the inner recessed portions and the outer recessed portions are arranged with phase differences with respect to each other in the circumferential direction, and the radial sliding bearing piece portion has a plurality of axial grooves which are open in the vertical direction and are formed in the cylindrical outer peripheral surface thereof by being spaced apart at equal intervals in the circumferential direction.

5. The synthetic resin-made sliding bearing according to claim 4, wherein each of the plurality of inner recessed portions is defined by an inner circular arc-shaped wall surface extending in a circular arc shape about the axis as a center; an outer circular arc-shaped wall surface extending in a circular arc shape about the axis as the center radially outwardly of the inner circular arc-shaped wall surface; a pair of semicircular wall surfaces respectively continuously connected to the inner circular arc-shaped wall surface and the outer circular arc-shaped wall surface and opposed to each other in the circumferential direction; and a bottom wall surface continuously connected to respective ones of the inner circular arc-shaped wall surface, the outer circular arc-shaped wall surface, and the pair of semicircular wall surfaces.

6. The synthetic resin-made sliding bearing according to claim 4, wherein each of the plurality of outer recessed portions is defined by an inner circular arc-shaped wall surface extending in a circular arc shape about the axis as the center; an outer circular arc-shaped wall surface extending in a circular arc shape about the axis as the center radially outwardly of the inner circular arc-shaped wall surface; a pair of semicircular wall surfaces respectively continuously connected to the inner circular arc-shaped wall surface and the outer circular arc-shaped wall surface and opposed to each other in the circumferential direction; and a bottom wall surface continuously connected to respective ones of the inner circular arc-shaped wall surface, the outer circular arc-shaped wall surface, and the pair of semicircular wall surfaces.

7. The synthetic resin-made sliding bearing according to claim 4, wherein a ratio of a total area of opening surfaces of the pluralities of inner recessed portions and outer recessed portions in surfaces which combine the opening surfaces of the pluralities of inner recessed portions and outer recessed portions and the annular upper surface of the thrust sliding bearing piece portion is 20 to 50%.

8. The synthetic resin-made sliding bearing according to claim 4, wherein the thrust sliding bearing piece has annular recessed grooves which are formed in the annular upper surface thereof along the circumferential direction and in at least two rows including an inner row and an outer row and formed concentrically with each other.

9. The synthetic resin-made sliding bearing according to claim 8, wherein a ratio of a total area of opening surfaces of the pluralities of inner recessed portions and outer recessed portions and opening surfaces of the at least two annular recessed grooves in surfaces which combine the opening surfaces of the pluralities of inner recessed portions and outer recessed portions, opening surfaces of the annular recessed grooves, and the annular upper surface of the thrust sliding bearing piece portion is 20 to 50%.

10. The synthetic resin-made sliding bearing according to claim 1, wherein the thrust sliding bearing piece has annular recessed grooves which are formed in the annular upper surface thereof along the circumferential direction and in at least two rows including an inner row and an outer row and formed concentrically with each other.

11. The synthetic resin-made sliding bearing according to claim 10, wherein a ratio of a total area of opening surfaces of the at least two annular recessed grooves in total surfaces which combine the opening surfaces of the annular recessed grooves and the annular upper surface of the thrust sliding bearing piece portion is 20 to 50%.

* * * * *